(12) United States Patent
Pate (10) Patent No.: US 7,360,983 B2
(45) Date of Patent: Apr. 22, 2008

(54) PORTABLE ELEVATED VEHICLE DISPLAY

(76) Inventor: Buck A. Pate, 613 Chestnut St., San Antonio, TX (US) 78202

( * ) Notice: Subject to any disclaimer, the term of this patent is extended or adjusted under 35 U.S.C. 154(b) by 81 days.

(21) Appl. No.: 10/814,540

(22) Filed: Mar. 31, 2004

(65) Prior Publication Data

US 2004/0197176 A1 Oct. 7, 2004

Related U.S. Application Data (60) Provisional application No. 60/460,261, filed on Apr. 4, 2003.

(51) Int. Cl.
*B60P 1/02* (2006.01)
(52) U.S. Cl. ...................................... 414/495
(58) Field of Classification Search ................ 414/495, 414/611, 672; 254/9 C, 8 C; 187/8.72
See application file for complete search history.

(56) References Cited

U.S. PATENT DOCUMENTS

| | | | | |
|---|---|---|---|---|
| 2,945,551 | A * | 7/1960 | Annin et al. ................ | 182/141 |
| 3,317,004 | A * | 5/1967 | Harrison, Jr. ................ | 254/91 |
| RE27,914 | E * | 2/1974 | King ............................ | 182/16 |
| 3,854,595 | A * | 12/1974 | Kuhn .......................... | 212/302 |
| 3,931,895 | A * | 1/1976 | Grimaldo .................... | 414/678 |
| 4,171,120 | A * | 10/1979 | Clark ............................ | 254/1 |
| 4,724,875 | A * | 2/1988 | Baldwin et al. .............. | 141/98 |
| 5,025,892 | A * | 6/1991 | Stelzl ......................... | 187/210 |
| 5,040,637 | A * | 8/1991 | Hawk .......................... | 187/206 |
| 5,056,624 | A * | 10/1991 | Georges ...................... | 187/272 |
| 5,086,704 | A | 2/1992 | Mueller | |
| 5,090,508 | A | 2/1992 | Nishikawa | |
| 5,340,082 | A * | 8/1994 | Holloway .................... | 254/88 |
| 5,538,357 | A | 7/1996 | Boswell | |
| 5,626,079 | A | 5/1997 | Summers | |
| 5,803,279 | A * | 9/1998 | Stallbaumer et al. ....... | 212/299 |
| 5,852,978 | A | 12/1998 | Daschel | |
| 6,024,528 | A * | 2/2000 | Taylor ........................ | 414/495 |
| 6,425,712 | B1 * | 7/2002 | Vanderklaauw ............. | 405/230 |
| 2003/0138309 | A1 | 7/2003 | Kozak | |
| 2005/0069404 | A1 | 3/2005 | Kozak | |
| 2005/0173601 | A1 | 8/2005 | Hestand | |

* cited by examiner

*Primary Examiner*—Charles A Fox
(74) *Attorney, Agent, or Firm*—Gunn & Lee, PC (57) ABSTRACT

The present invention shows a portable elevated vehicle display that may be lowered for a vehicle to be loaded on a display platform. By extension of a hydraulic cylinder in a parallelogram structure, the display platform and the vehicle may be raised into the air. Thereafter, the display platform and vehicle may be rotated and displayed. A slidable frame inside a portable base allows the display platform to be lowered very close to the ground for placement of the vehicle thereon prior to being raised into the air. Leveling jacks level the portable base in which the slidable frame is located. Outriggers and cables provide horizontal support in all directions.

13 Claims, 7 Drawing Sheets

PORTABLE ELEVATED VEHICLE DISPLAY

Applicant claims priority under 35 U.S.C. § 119 of U.S. Provisional Application Ser. No. 60/460,261, filed Apr. 4, 2003.

FIELD OF THE INVENTION

The present invention relates to a platform for displaying an automobile and, more particularly, to a portable elevated vehicle display that (a) is moveable, (2) will raise a vehicle up in the air, and (3) will rotate the vehicle.

BACKGROUND INFORMATION

A common way for dealerships to attract customers is to feature a particularly attractive vehicle in front of the dealership. The selected vehicle many times is raised above other surrounding vehicles by a berm or some other structure in front of the dealership. The objective is to have the selected vehicle so that it can be easily seen by passing motorists that may be in the market for an automobile.

Such displays do not normally provide for movement of the vehicle while being displayed. The vehicle is in a stationary position and the passing motorist may or may not be at a good angle to get a good view of the vehicle being featured by the dealership. To alleviate this problem, at least one inventor has a display for a vehicle that is on an incline and rotates. Such an invention is shown in U.S. Pat. No. 5,852,978 to Daschel. However, the Daschel invention has a number of disadvantages, including it does not lift the vehicle up into the air so it can be seen from a distance by passing motorists. While there will be some raising of the vehicle when displayed with the Daschel invention, it will not be that much. In other words, a passing motorist will not be able to see the selected vehicle being displayed from a long distance if the Daschel invention is utilized. Also, the Daschel invention does not have the feature of portability. Once the Daschel display is put into place, it is difficult to move to another location.

Another vehicle display stand is shown in European Patent Office Publication No. 0 465 497 B1 by Kankaanpaa. The Kankaanpaa invention has some of the same disadvantages as the Daschel invention. While it will raise the vehicle slightly and the vehicle can be turned, the Kankaanpaa invention does not raise the vehicle any significant distance in the air. Also, the Kankaanpaa invention is not portable.

The present invention solves these and other problems by providing a parallelogram structure that will lower to the ground on which a vehicle can be loaded. After loading, the parallelogram structure will raise the vehicle up into the air. A display platform on top of the parallelogram structure may spin around and spin the vehicle that is on the display platform. In that manner, passing motorists can see the vehicle selected for display from a distance. Each time the motorists pass, the selected vehicle, which is continually turning, can be seen from different angles. In that manner, the passing motorists can get a good view of the entire vehicle being displayed and hopefully be enticed into the dealership to investigate buying a similar or like branded vehicle.

Also, the portable elevated vehicle display is constructed in a manner so it is very stable once the vehicle is raised up into the air, stability being provided in all four directions. In case the ground is not level, leveling devices can also be included to level the portable elevated vehicle display.

SUMMARY OF THE INVENTION

It is an object of the present invention to provide a portable elevated vehicle display.

It is another object of the present invention to provide a vehicle display that may be movable from one automobile dealership to another.

It is still another object of the present invention to provide a display that can be lowered to the ground, an automobile loaded thereon and subsequently raised up into the air with the automobile being visible from a long distance.

It is yet another object of the present invention to provide a portable frame on which an elevated vehicle display may be mounted.

It is a further object of the present invention to provide an elevated portable vehicle display on which a vehicle may be continuously turned while being displayed in an elevated position.

It is even another object of the present invention to provide lateral support for supporting the vehicle and the portable elevated vehicle display when raised in an elevated position.

In the present invention, a portable base is provided to which wheels are attached for portability. Each corner of the portable base has leveling jacks to ensure the portable base is perfectly level. On the sides, the portable base has outriggers with leveling jacks on the end thereof to provide side support for the portable base.

Inside of the portable base is a slidable frame. The slidable frame is designed with wheels on either end thereof so it will move inside of the portable base. Pivotally mounted on top of the slidable frame is a parallelogram structure. Hydraulic cylinders extend from one side of the parallelogram structure to the other side of the parallelogram structure. If the hydraulic cylinders are retracted, the two sides of the parallelogram come together with the top portion being lowered. Simultaneously, the slidable frame moves to the rear of the portable frame. On the top of the parallelogram structure is located a display platform. The display platform rests on a bearing plate so it may turn when in the raised position.

In the preferred embodiment of the present invention, the display platform is lowered by retracting the hydraulic cylinders. When the platform is fully lowered, a vehicle can be loaded on the display platform. Then the hydraulic cylinders are extended causing the parallelogram to separate and the display platform located on the top thereof to be raised. This raises the automobile up into the air. Cables attached to the display platform provide front-to-back support. Lateral support for the display platform is provided by outriggers from the portable frame. The slidable frame may be pinned into position inside of the portable base once the vehicle is in the elevated position in the air. A motor and gear continually turn the automobile on the display platform so the automobile may be viewed by the passing public.

These and other objects of the invention are possible when considering the invention in the preferred embodiment described hereinbelow.

DESCRIPTION OF THE PREFERRED EMBODIMENT

Figure 1:
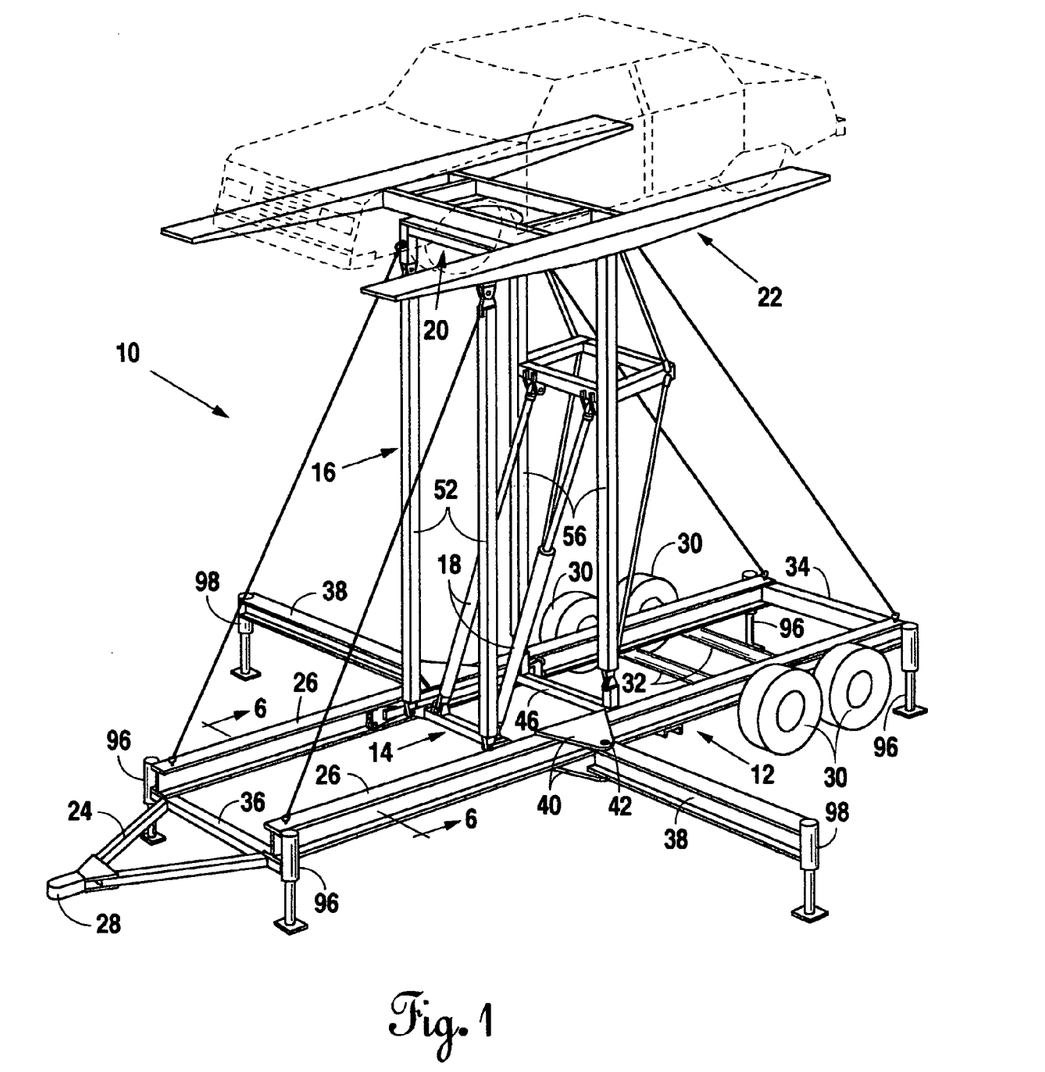
FIG. 1 is a perspective view of the portable elevated vehicle display showing an automobile being displayed thereon.

Referring now to FIG. 1 in combination with FIG. 2, a description of the preferred embodiment of the portable elevated vehicle display will be provided hereinbelow. A portable elevated vehicle display represented generally by reference numeral 10 is shown in use in FIG. 1 and in an exploded view in FIG. 2. A portable base 12 is provided for the portable elevated vehicle display 10. Mounted within the portable base 12 is a slidable frame 14. Connected above the slidable frame 14 is a parallelogram structure 16 that may be raised and lowered by extending hydraulic cylinders 18. Connected on the opposite end of the parallelogram structure 16 from the slidable frame 14 is located a platform support 20. Located above the platform support 20 is the display platform 22.

Referring now to the portable base 12, the portable base 12 will be described in more detail in conjunction with FIGS. 1 and 2. On the front of the portable base 12 is a vehicle tow bar 24 that connects to side I-beams 26 on one end thereof. The opposite end of the vehicle tow bar 24 has a trailer hitch 28 so that the vehicle tow bar 24 can be attached to the trailer hitch of a vehicle, so that the entire portable elevated vehicle display 10 may be moved from one location to another.

Near the rear of the portable base 12 are wheels 30 connected on the opposite ends of axles 32 that extend under the side I-beams 26. The space between the side I-beams 26 is maintained a constant distance by end beam 34 and spacing plate 36. Both the end beam 34 and spacing plate 36 ensure the side I-beams 26 are maintained a uniform distance apart. On each side of side I-beams 26 are pivotally connected outriggers 38. Outriggers 38 connect through plates 40 and pivot pins 42 to each respective side of the side I-beams 26. When the portable elevated vehicle display 10 is being moved from one location to another, outriggers 38 are folded into the side I-beams 26.

Figure 6:
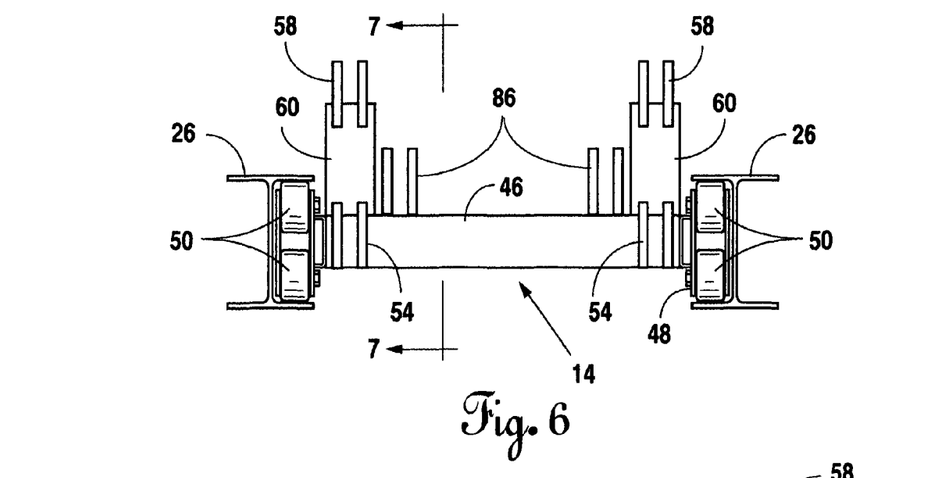
FIG. 6 is a partial sectional view of the portable frame and slidable frame mounted therein as shown in section lines 6-6 of FIG. 1.
Figure 7:
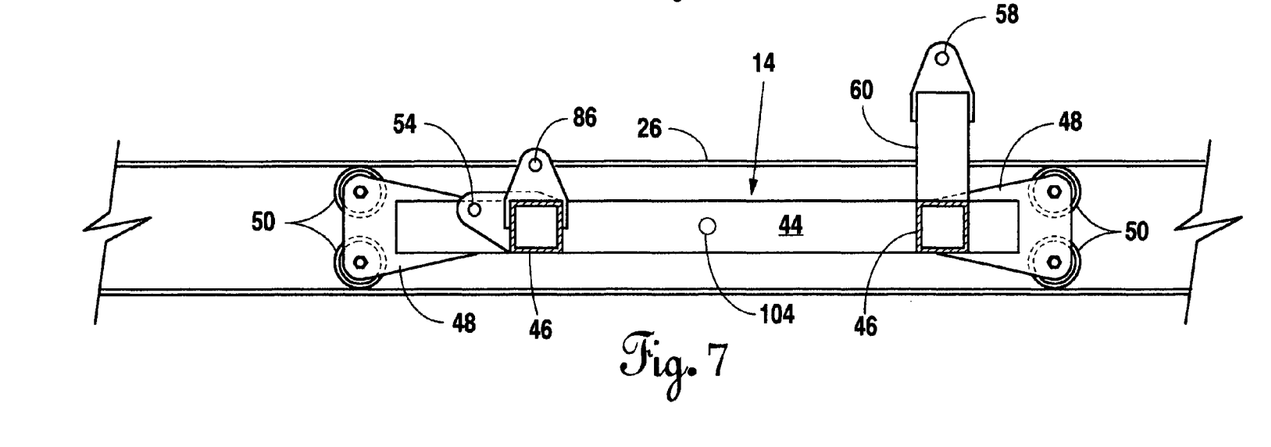
FIG. 7 is a partial sectional view of FIG. 6 along section lines 7-7.

Referring now to FIGS. 6 and 7 in combination with FIGS. 1 and 2, the slidable frame 14 will be explained in further detail. Referring specifically to FIGS. 6 and 7, the slidable frame 14 has tubular steel sides 44 and tubular steel cross braces 46. Connected on the ends of the tubular steel sides 44 are wheel mounting plates 48 and wheels 50 on the ends thereof. The portable frame 12 is designed so the wheels 50 ride inside of the side I-beams 26. The side I-beams 26 are spaced a sufficient distance apart so that the slidable frame 14 is received therein with wheels 50 riding inside of the side I-beams 26.

Figure 2:
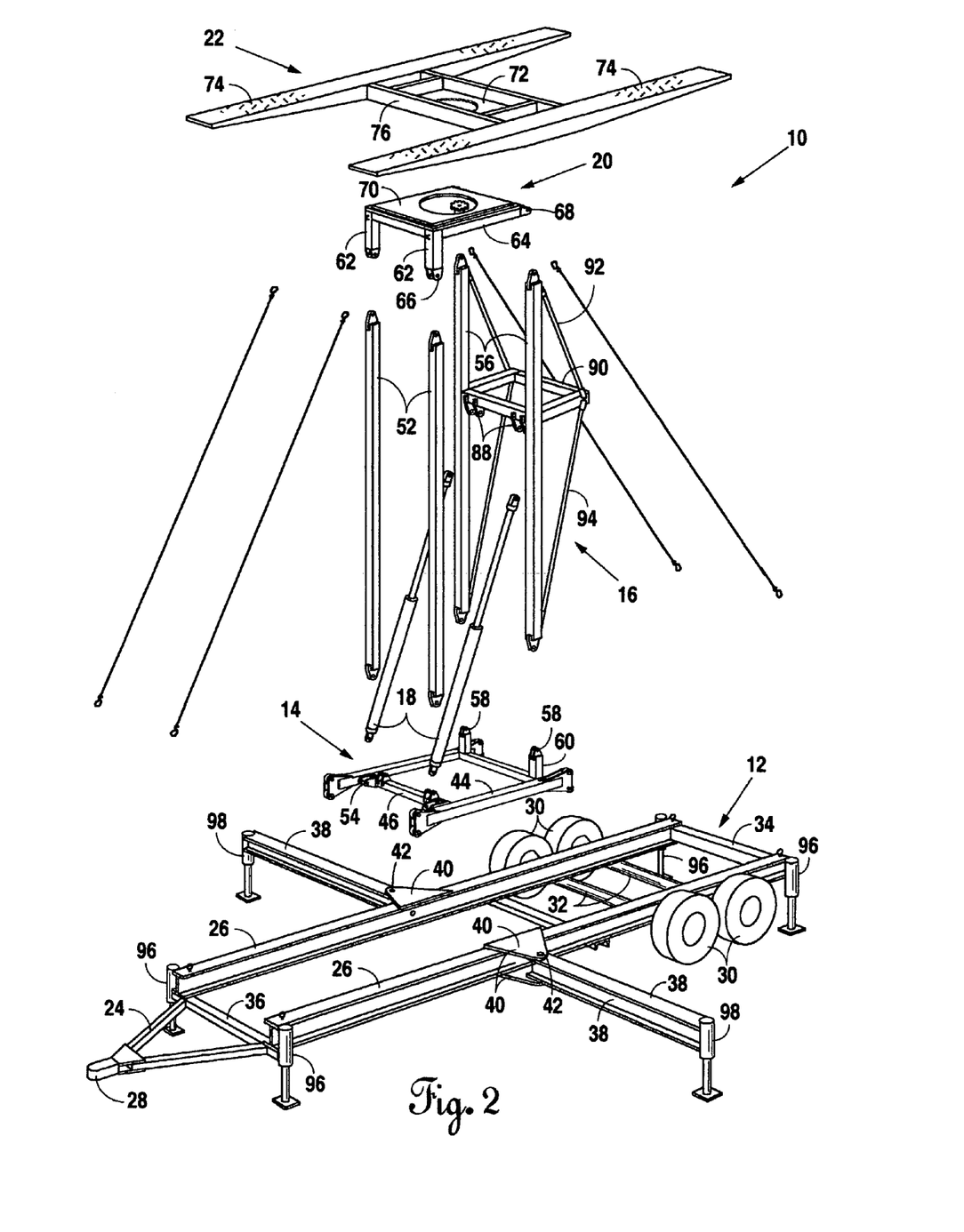
FIG. 2 is an exploded perspective view of the portable elevated vehicle display.

Referring now to FIGS. 1 and 2 with FIGS. 6 and 7, the parallelogram structure 16 will be explained in further detail. A pair of front lifting braces 52 are pivotally connected on the lower end thereof to pivot points 54 by pivot pins (not shown). The parallelogram structure 16 also has a pair of rear lifting braces 56 that are pivotally connected on the lower ends thereof to pivot point 58. Pivot points 58 are raised above pivot point 54 on the slidable frame 14 by lower extension 60.

The upper end of the parallelogram structure 16 pivotally connects to platform support 20. Platform support 20 has a downward extension 62 on each forward 4 corner thereof (see FIGS. 2 and 8B in combination). The downward extension 62 connects on the upper end thereof to a platform support frame 64. On the lower end of downward extension 62 is a pivot point 66 to which is pivotally connected the upper end of front lifting braces 52 by pivot pins (not shown). On the rear of platform support 20 and platform support frame 64 are located pivot points 68 to which is pivotally connected the upper end of the rear lifting braces 56. On top of the platform support 20 is a lower bearing support plate 70.

Figure 8A:
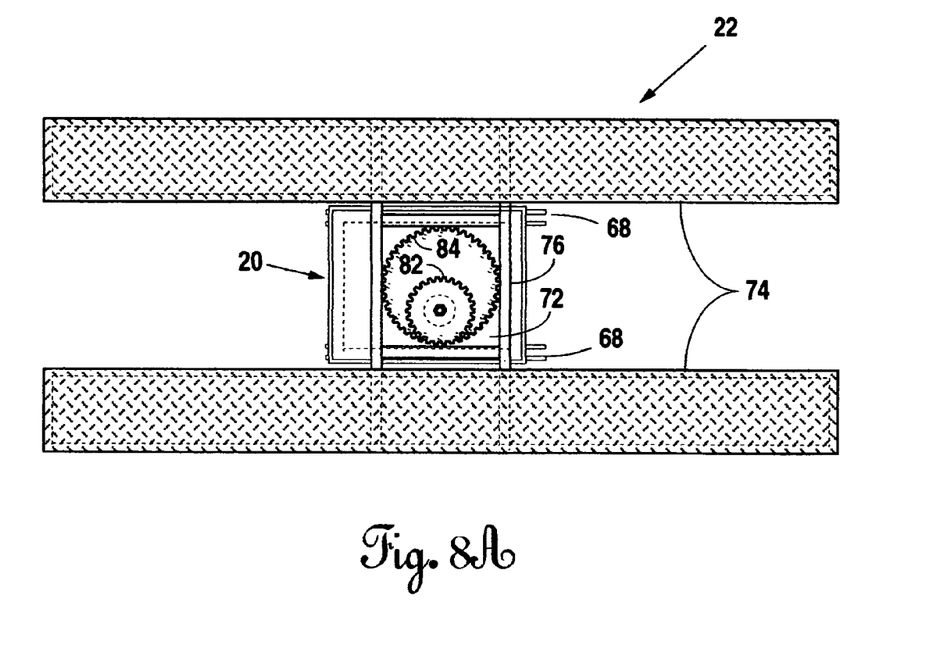
FIG. 8A is a top view of the display platform and rotating structure.
Figure 8B:
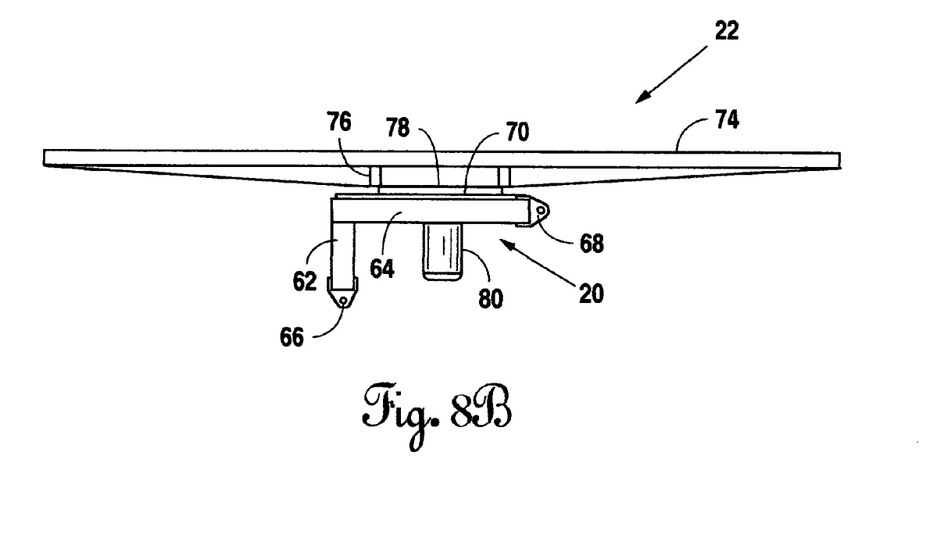
FIG. 8B is a side view of the display platform and rotating structure.

Located above lower bearing support plate 70 is upper bearing support plate 72. Upper bearing support plate 72 is connected to the lower side of display platform 22. The display platform 22 has two wheel channels 74 connected on opposite sides of platform frame 76. The upper bearing support plate 72 is connected to the underside of platform frame 76. Located between the lower bearing support plate 70 and upper bearing support plate 72 are bearings 78. A typical bearing 78 may be Model No. SRB-129.8-0.88-104T48 made by Gear Products, Inc. in Tulsa, Okla.

Located below the platform support frame 64, but mounted thereto, is an electric motor 80. On the upper end of the shaft extending from the electric motor 80 is mounted a motor gear 82, which mates with the teeth of platform gear 84 connected to upper bearing support plate 72. By applying voltage to electric motor 80, electric motor 80 turns motor gear 82, which in turn will turn platform gear 84. Platform gear 84, being connected to upper bearing support plate 70, will cause the entire display platform 22 to rotate.

Referring to FIGS. 1 and 2, the operation of the hydraulic cylinders 18 will be explained in more detail. The hydraulic cylinders 18 are connected to a hydraulic pump (not shown) and a source of hydraulic fluid (not shown), both of which may be supplied as part of the portable elevated vehicle display, or independently provided.

The lower end of the hydraulic cylinders 18 are connected to lower hydraulic cylinder pivot points 86 (see FIGS. 6 and 7). The upper ends of hydraulic cylinders 18 are connected to upper hydraulic cylinder pivot points 88 (see FIG. 2). Because the hydraulic cylinders 18 would exert too much force on rear lifting braces 56 and would cause them to flex or bend, the upper hydraulic cylinder pivot points 88 are connected to support frame 90. Support frame 90 extends perpendicular to rear lifting braces 56 to which it connects. Support frame 90 has on either side thereof reinforcement rods 92 and 94. The purpose of reinforcement rods 92 and 94 connected through support frame 90 is to ensure the rear lifting braces 56 do not flex to the extent they bend or break when the hydraulic cylinders are extended.

Referring again to the portable base 12, each corner thereof has leveling jacks 96. The leveling jacks 96 may be adjusted to ensure the portable base 12 is perfectly level. Also, the outriggers 38 have outrigger leveling jacks 98 to ensure the outriggers are also level.

Figure 3:
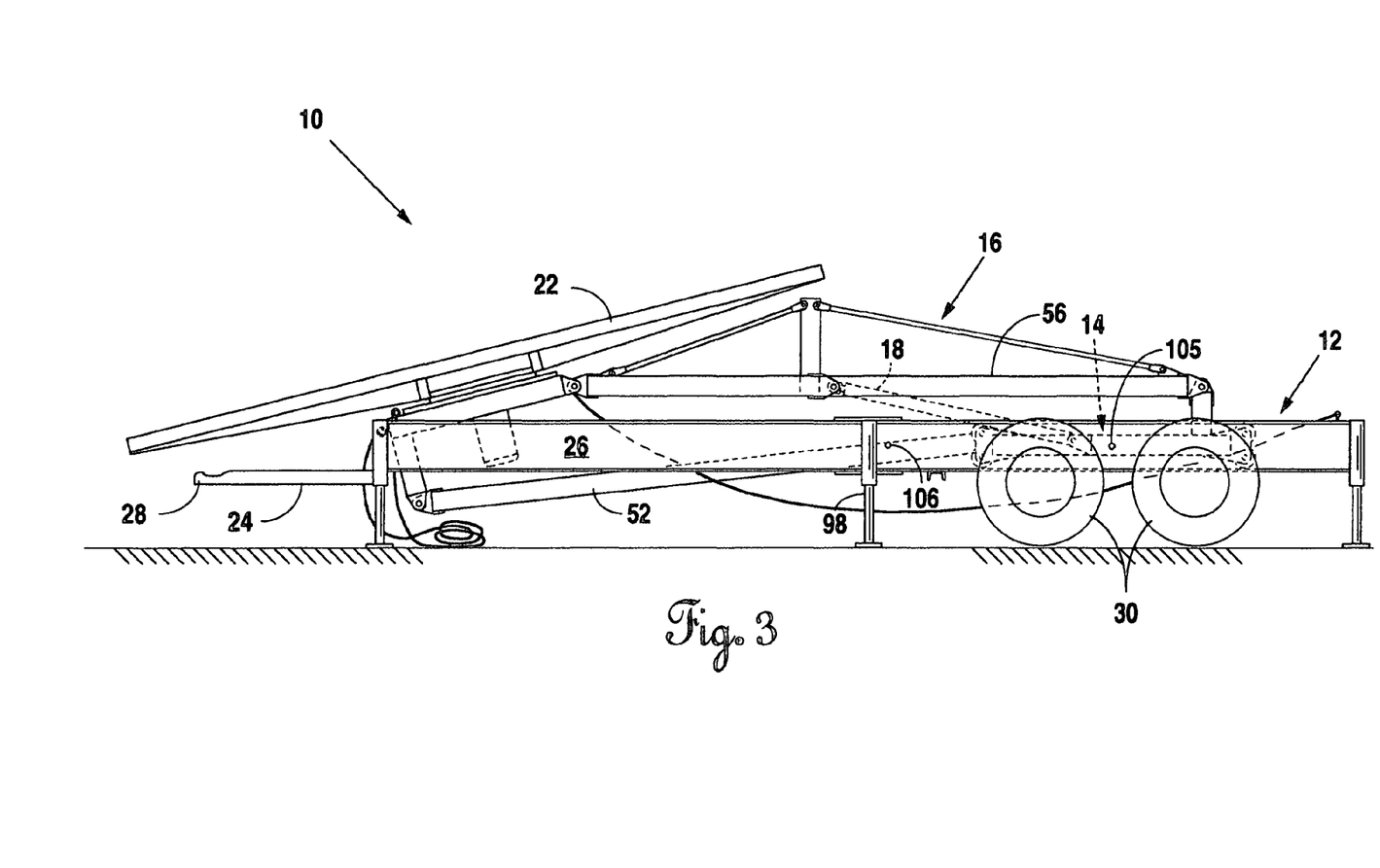
FIG. 3 is a side view of the portable elevated vehicle display in its lowered position.
Figure 4:
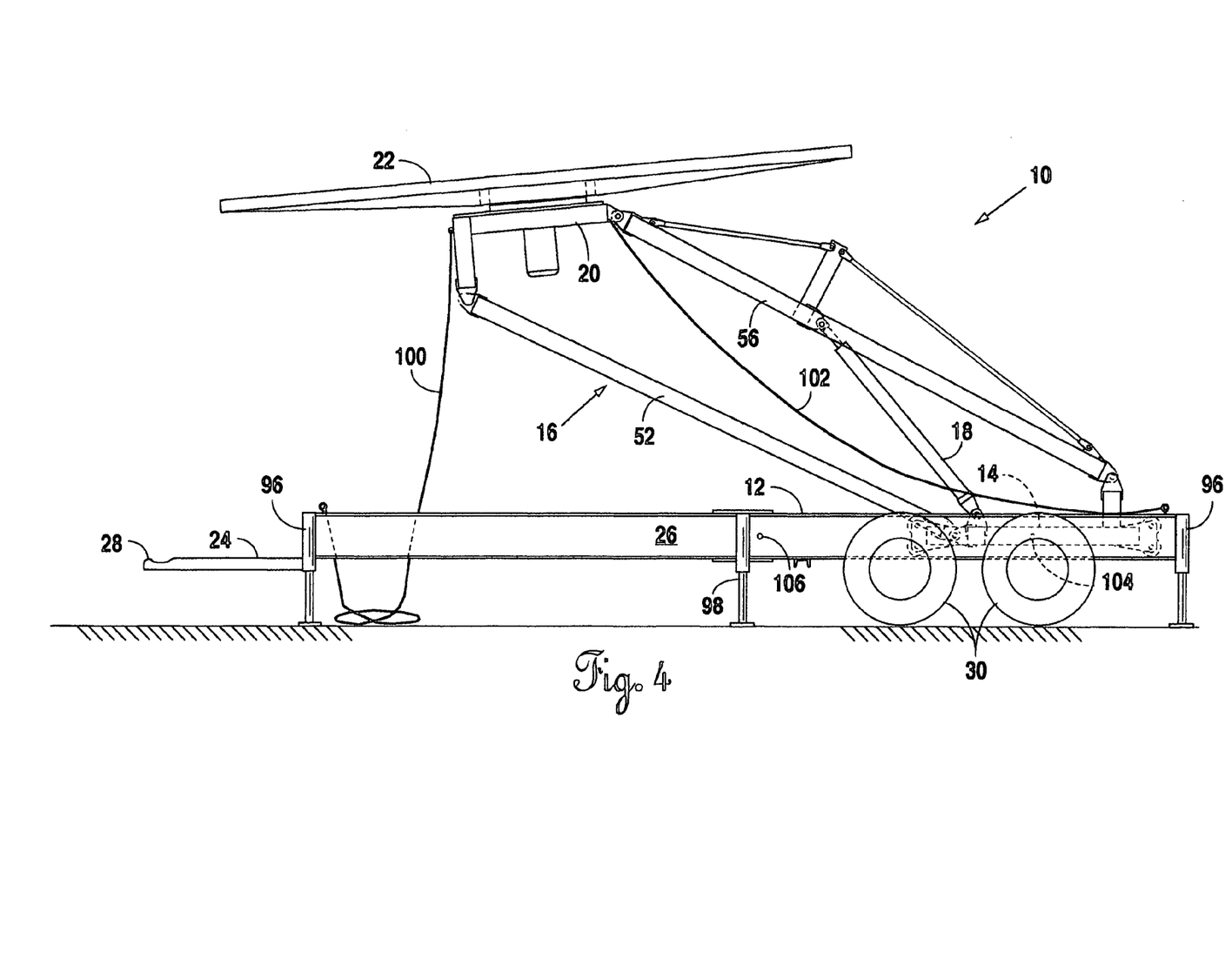
FIG. 4 is a side view of the portable elevated vehicle display in a partially raised position.
Figure 5:
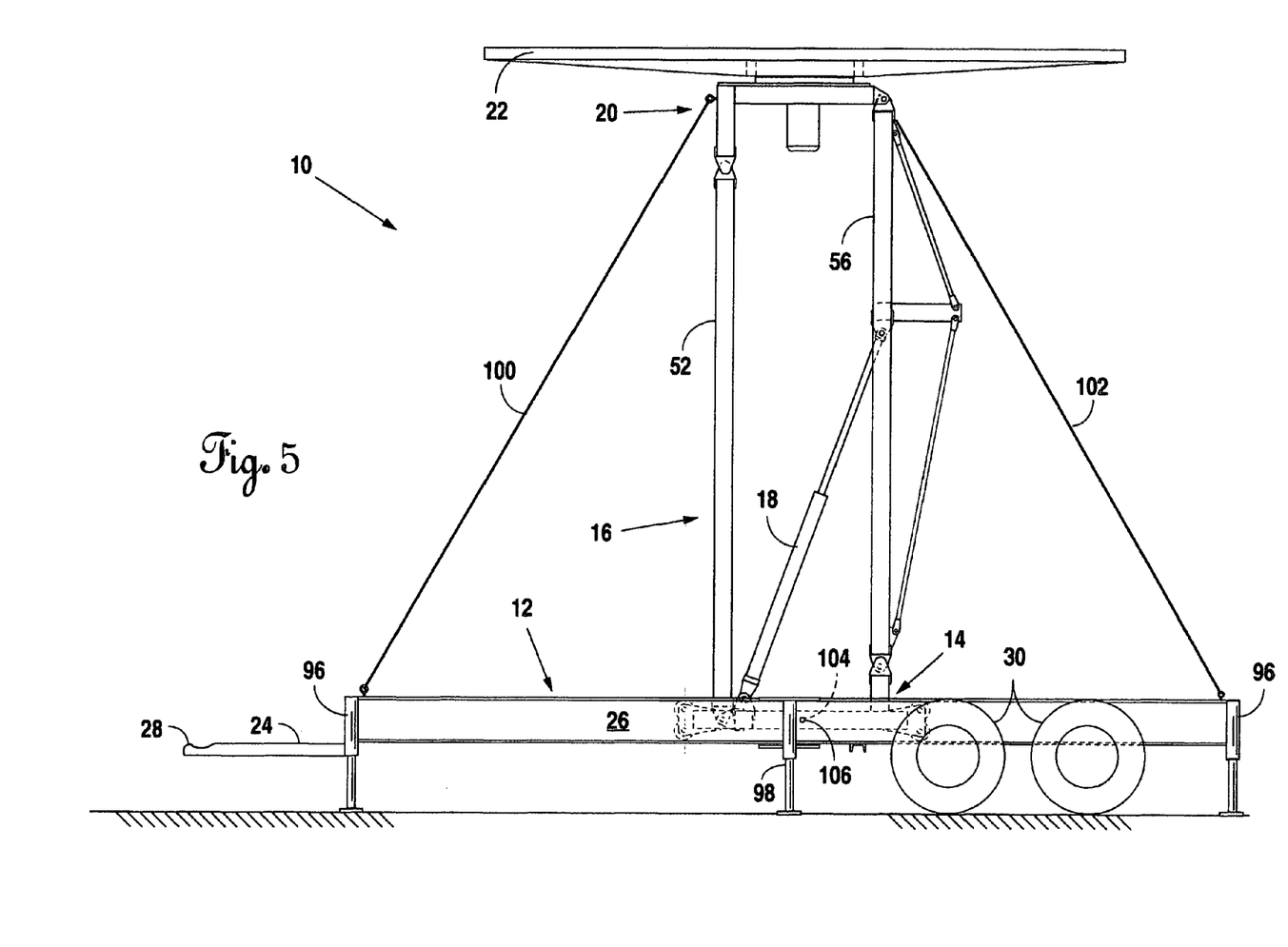
FIG. 5 is a side view of the portable elevated vehicle display in its fully elevated position.

Referring now to FIGS. 3, 4, and 5 in combination, the present invention will be explained in further detail. Referring first to FIG. 3, the portable elevated vehicle display 10 is shown in its lowest position. The display platform 22 is lowered by retracting hydraulic cylinders 18, which brings the parallelogram structure 16 closer together. Meanwhile, slidable frame 14 has moved to the rear of the side I-beams 26. In case of movement of the portable elevated vehicle display to a new location, or upon loading a vehicle thereon, the slidable frame is locked into position by a bolt (not shown) extending through hole 105 in side I-beams 26 and slidable frame 14.

Referring now to FIG. 4, hydraulic cylinder 18 is starting to extend. The extension of hydraulic cylinder 18 causes display platform 22 to move upward from the portable base 12. At this point, the slidable frame 14 is still in the rear of the side I-beams 26. Parallelogram structure 16 and its respective front lifting braces 52 and rear lifting braces 56 begin to move apart. Once the hydraulic cylinder 18 extends to a certain point, rear cable 102 will become taut. Hydraulic cylinder 18 can only extend further by movement of slidable frame 14 forward within side I-beams 26. By further expansion of the hydraulic cylinders 18, the slidable frame 14 moves forward and the parallelogram structure 16 formed by front lifting brace 52 and rear lifting brace 56 will move to the full upright position as shown in FIG. 5, thereby raising display platform 22 into the air. At this point, slidable frame 14 will have moved forward within the side I-beams 26. Also, cable 102 will have become taut. Once cables 100 and 102 are taut, forward movement of slidable frame 14 will end. At that point, a bolt (not shown) is extended through holes 104 in slidable frame 14 and holes 106 in the side I-beams 26. The insertion of the bolt through the holes 104 and 106 locks slidable frame 14 into position. Cables 100 and 102 provide support from front to back of the portable base 16. Outriggers 38 provide the side-to-side support for the portable base 12.

In a preferred method of operation, display platform 22 is lowered to its lowermost position as shown in FIG. 3. After a vehicle is loaded on display platform 22, hydraulic cylinders 18 are extended to raise display platform 22 and the vehicle displayed thereon as shown in the sequential views as shown in FIGS. 3, 4, and 5. Once hydraulic cylinder 18 is fully extended and cables 100 and 102 are taut, slidable frame 14 is bolted into position inside of the side I-beams 26. If everything is still level, including the outriggers 38, then power can be applied to electric motor 80, which will cause display platform 22 to rotate. In this manner, if the portable elevated vehicle display 10 is located in front of an automobile dealership, the vehicle selected for display will now be up in the air on display platform 22 and rotated so it can be observed by all that pass by. In the preferred embodiment, the display platform 22 and vehicle located thereon is raised to a height of between 10 to 25 feet into the air.

Once a particular dealer is through with the portable elevated vehicle display 10, after turning off electric motor 80, hydraulic cylinder 18 can be retracted and the vehicle lowered and removed from display platform 22. By retracting the leveling jacks 96 and the outrigger leveling jacks 98, and pivoting the outriggers 38 into the side I-beams 26, the portable elevated vehicle display 10 is ready for movement to its new location once the slidable frame 14 has been bolted into position. If one person owns multiple dealerships, he can rotate the portable elevated vehicle display 10 from dealership to dealership for display of selected vehicles at each dealership.

I claim:

1. A portable elevated vehicle display for displaying a vehicle being offered for sale comprising:
   a portable base having leveling devices on corners thereof;
   a frame carried by said base;
   a parallelogram structure pivotally attached on a lower end thereof to said frame, said frame forming a lower part of said parallelogram structure;
   a platform support pivotally attached to an upper end of said parallelogram structure and forming an upper part thereof;
   a display platform mounted on top of said platform support for displaying said vehicle thereon;
   an extender connected on a first end to a first side of said parallelogram structure and on a second end to a second side of said parallelogram structure, upon said extender being extended said parallelogram structure pivoting to an upright position thereby lifting said display platform and said vehicle thereon vertically, upon said extender being retracted said parallelogram structure pivoting to a generally horizontal position thereby lowering said display platform and said vehicle thereon;
   wherein said portable base has outriggers for side support, said outriggers also having leveling devices; and
   wherein said frame is slidable within said base in response to extension or retraction of said extender.

2. A portable elevated vehicle display for displaying a vehicle being offered for sale as recited in claim 1 wherein said extender is a hydraulic cylinder.

3. A portable elevated vehicle display for displaying a vehicle being offered for sale as recited in claim 1 wherein said frame is bolted to said portable base upon said parallelogram structure being pivoted to said upright position.

4. A portable elevated vehicle display for displaying a vehicle being offered for sale as recited in claim 3 wherein said frame has a raised rear portion thereof which pivotally connects at its top to said lower end of said parallelogram structure thereby allowing said display platform to lower fully upon said extender retracting.

5. A portable elevated vehicle display for displaying a vehicle being offered for sale as recited in claim 1 further comprising:
   bearings between said platform support and said display platform;
   motor connected to gears between said platform support and said display platform for rotating said display platform and said vehicle located thereon.

6. A portable elevated vehicle display for displaying a vehicle being offered for sale as recited in claim 1 wherein said portable base is mounted on wheels.

7. A portable elevated vehicle display for displaying a vehicle being offered for sale as recited in claim 6 wherein said portable base has cables for front-to-back support when said parallelogram structure is pivoted to said upright position.

8. A portable elevated vehicle display for displaying a vehicle being offered for sale as recited in claim 7 wherein said portable base has I-beam type sides with said frame being slidable within said I-beam type sides.

9. A method of displaying a vehicle at an elevated height comprising the following steps:
   moving a portable vehicle display to a desired location;
   supporting said support structure with outriggers on sides of said portable vehicle display for lateral support wherein corners of said portable vehicle display and said outriggers are leveled by leveling jacks;
   driving said vehicle onto a display platform of said portable vehicle display;
   raising a support structure with said display platform and said vehicle on one end thereof to an elevated height wherein said raising step of said support structure includes separating opposing sides of a parallelogram pivotally connected on a lower end to a frame and on an upper end to said display platform and wherein said frame is slidable within a portable base, said frame being near one end of said portable base during said driving step and near a middle of said portable base after said raising step is completed;
rotating said display platform and said vehicle; and
reversing the preceding rotating, raising and driving steps to remove said vehicle.

10. The method of displaying said vehicle as recited in claim 9 which includes after said raising step providing support in a plurality of directions for said display platform and said vehicle.

11. The method of displaying said vehicle as recited in claim 10 wherein said providing support includes cables connected between ends of said portable vehicle display and an upper end of said support structure for front-to-back support.

12. The method of displaying said vehicle as recited in claim 9 wherein said frame is secured to said portable base during said moving step and said rotating step.

13. The method of displaying said vehicle as recited in claim 9 wherein said display platform and said vehicle are raised between 10 and 25 feet into the air.

* * * * *